(12) United States Patent
Pericevic et al.

(10) Patent No.: US 8,851,241 B2
(45) Date of Patent: Oct. 7, 2014

(54) HYDRAULIC DISC BRAKE HAVING A PARKING BRAKE MECHANISM

(75) Inventors: Aleksandar Pericevic, Munich (DE); Johann Baumgartner, Moosburg (DE); Steffen Geissler, Hallbergmoos (DE); Robert Trimpe, Wessling (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 487 days.

(21) Appl. No.: 12/561,744

(22) Filed: Sep. 17, 2009

(65) Prior Publication Data

US 2010/0072003 A1 Mar. 25, 2010

Related U.S. Application Data

(63) Continuation of application No. PCT/EP2008/002131, filed on Mar. 18, 2008.

(30) Foreign Application Priority Data

Mar. 20, 2007 (DE) .................. 10 2007 013 851
Dec. 14, 2007 (DE) .................. 10 2007 060 270

(51) Int. Cl.
*F16D 55/02* (2006.01)
*F16D 65/18* (2006.01)
*F16D 65/56* (2006.01)
*F16D 123/00* (2012.01)
*F16D 125/32* (2012.01)
*F16D 121/02* (2012.01)
*F16D 121/14* (2012.01)

(52) U.S. Cl.
CPC ............ *F16D 65/18* (2013.01); *F16D 2123/00* (2013.01); *F16D 2125/32* (2013.01); *F16D 2121/02* (2013.01); *F16D 2121/14* (2013.01); *F16D 65/567* (2013.01)
USPC .................. 188/71.7; 188/196 A; 188/196 D; 188/196 P; 188/71.1

(58) Field of Classification Search
USPC ........ 188/196 D, 196 P, 196 C, 196 A, 196 F, 188/196 R, 71.1
See application file for complete search history.

(56) References Cited

U.S. PATENT DOCUMENTS 3,942,827 A * 3/1976 Warlop et al. .......... 188/196 BA
3,983,975 A * 10/1976 Wright ........................ 188/265

(Continued)

FOREIGN PATENT DOCUMENTS

DE 41 21 054 A1 1/1993
DE 196 04 402 A1 8/1997

(Continued)

OTHER PUBLICATIONS

Breuer, Bert et al., "Bremsenhandbuch", Vieweg & Sohn press, 3rd Edition, Section 7.2.1.6, pp. 99 and 100, 2006.

(Continued)

*Primary Examiner* — Robert A Siconolfi
*Assistant Examiner* — James Hsiao
(74) *Attorney, Agent, or Firm* — Crowell & Moring LLP

(57) ABSTRACT

A hydraulic disc brake includes at least one brake piston that acts upon a brake pad and a parking brake mechanism. A return piston is accommodated in a piston head having a recess. The piston head faces the brake pad.

11 Claims, 2 Drawing Sheets

(56) References Cited

U.S. PATENT DOCUMENTS

| | | | | |
|---|---|---|---|---|
| 4,306,635 A | * | 12/1981 | Mitchell | 188/72.4 |
| 4,635,760 A | * | 1/1987 | Le Marchand et al. | 188/71.9 |
| 4,779,711 A | * | 10/1988 | Fabbro et al. | 188/196 D |
| 5,172,792 A | * | 12/1992 | Cartwright et al. | 188/71.1 |
| 5,443,141 A | * | 8/1995 | Thiel et al. | 188/71.9 |
| 5,607,033 A | * | 3/1997 | Naedler et al. | 188/71.8 |
| 5,921,356 A | * | 7/1999 | Stringer et al. | 188/196 D |
| 6,478,120 B2 | * | 11/2002 | Runkel et al. | 188/71.9 |
| 6,988,596 B2 | * | 1/2006 | Gerard et al. | 188/72.8 |
| 7,178,645 B2 | * | 2/2007 | Maehara | 188/196 P |

FOREIGN PATENT DOCUMENTS

| | | |
|---|---|---|
| EP | 0 249 522 A1 | 12/1987 |
| JP | 61-161441 U | 10/1986 |
| JP | 3-46263 Y2 | 9/1991 |

OTHER PUBLICATIONS

International Search Report dated Jan. 12, 2009 with English translation (four (4) pages).

* cited by examiner

HYDRAULIC DISC BRAKE HAVING A PARKING BRAKE MECHANISM

CROSS REFERENCE TO RELATED APPLICATIONS

This application is a continuation of PCT International Application No. PCT/EP2008/002131, filed Mar. 18, 2008, which claims priority under 35 U.S.C. §119 to Patent Application No. 10 2007 013 851.4, filed Mar. 20, 2007, and to German Patent Application No. 10 2007 060 270.9, filed Dec. 14, 2007, the entire disclosures of which are herein expressly incorporated by reference.

BACKGROUND AND SUMMARY OF THE INVENTION

The invention relates to a method and a hydraulically actuated disc brake having at least one brake piston which acts on a brake pad and which is arranged in a brake housing, along with a parking brake device.

The invention is concerned, in particular, with a method, which is simplified and more failsafe in relation to the prior art, for restoring the brake piston for the purpose of a brake pad exchange.

A piston of a so-called combination brake, which has a parking brake actuating facility and an associated wear adjusting system, is described and illustrated, for example, in the brake handbook by Breuer/Bill, Freidr. Vieweg & Sohn press, $3^{rd}$ edition, in section "7.2.1.6—Kombinierter Faustsattel [Combined floating caliper]". The restoration of the piston for the purpose of a brake pad exchange requires the adjusting nut to be turned back on the thread of the adjusting screw. Although the thread is not self-locking, the rotation of the adjusting nut is hindered by means of friction on the brake piston so that, when the parking brake is applied, the clamping force can be transmitted via the thread and the friction to the brake piston. Special tools are required for turning back the adjusting nut, and as a result of the rotational movement of the brake piston, the seals (piston sealing ring, dust protection flap), which are in contact with the brake piston, can be influenced in terms of their action, or damaged.

DE 196 04 402 describes a device in which the necessity for turning back the piston is avoided. A problem with this solution is, however, the necessity for inserting different screws into the central threaded through hole in the piston head for operating and for servicing the brake. Here, there is the risk of the servicing screw not being removed after the servicing work, thereby making the adjusting device and, ultimately, the parking brake inoperative.

Another solution for preventing the rotation of the piston in order to restore the latter is implemented in "Brembo"-type brakes, for example. In such brakes, the piston head is provided with a large opening through which a special restoring piston can be accessed. To restore the brake piston, the restoring piston is placed in engagement, by way of an axial movement, with the adjusting nut so as to transmit a rotational movement. By rotating the restoring piston, the adjusting nut is now turned back, as a result of which the brake piston can be restored by being simultaneously turned back.

The described methods are implemented in floating-caliper brakes. In brakes of this type, the brake caliper must be dismounted for the purpose of a brake pad exchange, since the brake pads are otherwise inaccessible for a brake pad exchange. When the brake calipers are dismounted, the described working processes for restoring the piston can be carried out with relative ease, since sufficient space is available.

In heavy utility or commercial vehicles, use is preferably made of frame calipers, whose particular advantage is that the relatively heavy brake caliper need not be dismounted and removed from the brake disc for the purpose of a brake pad exchange, since the brake pads can be removed through the frame opening of the brake caliper with ease. When the brake is installed, very unfavorable conditions are present for restoring the brake piston, on account of the brake often being positioned in a poorly accessible location and on account of the small distance between the brake disc and the housing part of the frame caliper. The previously described methods can only be carried out in a very cumbersome and time-consuming manner, which leads to increased servicing costs and also to servicing errors.

Against this background, it is intended to find a servicing method and an associated design of the hydraulic brake with an integrated parking brake, in which the restoration of the brake piston—similarly to the simple hydraulic brake—takes place merely by pushing back the piston.

According to the invention, a hydraulically activated disc brake is provided having at least one brake piston, which acts on a brake pad and which is arranged in a brake housing, along with a parking brake device. A restoring piston is held in a piston head, which piston head faces toward the brake pad of the brake piston.

In one embodiment, during a hydraulic actuation of the brake, the restoring piston bears against a contact shoulder of the adjusting nut under the action of pressure, and thereby maintains frictional contact, counter to the force of the restoring spring, in the friction cone coupling in order to prevent a rotation of the adjusting nut. In this state, in the release direction of the cone coupling, the restoring piston has a small spacing with respect to the adjusting nut with the interposed axial bearing, which spacing ensures a minimum play even taking into consideration tolerances and operational deformations. On the side facing toward the brake pad, the restoring piston has a defined projecting length with respect to the contact surface in the depression of the piston head.

In another variant, during a hydraulic actuation of the brake, the restoring piston bears against a contact shoulder of the brake piston under the action of the pressure. In this state, the restoring piston has a small spacing with respect to the adjusting nut with the interposed axial bearing, which spacing ensures a minimum play even taking into consideration tolerances and operational deformations. On the side facing toward the brake pad, the restoring piston has a defined projecting length with respect to the contact surface in the depression of the piston head.

For restoring the piston, a spacer is inserted into the depression of the piston head, which spacer is supported, on the side facing away from the piston, against the brake disc. In the case of multi-piston brakes, spacers of this type are inserted into all the pistons. The sliding caliper is now pushed in the direction of the brake disc. Here, the spacer bears against the contact surface in the depression of the piston head and pushes the restoring piston back until the latter likewise bears against the contact surface. During this rearward pushing movement, the restoring piston sets down via the axial bearing on the end surface of the adjusting nut and raises the latter with its friction cone up from its seat in the piston. The adjusting nut passes out of its frictionally locked state and may now be turned back, as the brake piston is pushed back further, in the non-self-locking thread of the adjusting screw under the action of the axial force.

The restoring of the brake piston is therefore achieved, after the insertion of the spacer, by simply pushing the brake caliper. Alternatively, with the brake caliper fixed, the restoring of the piston may also be effected by exerting pressure on the spacer.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
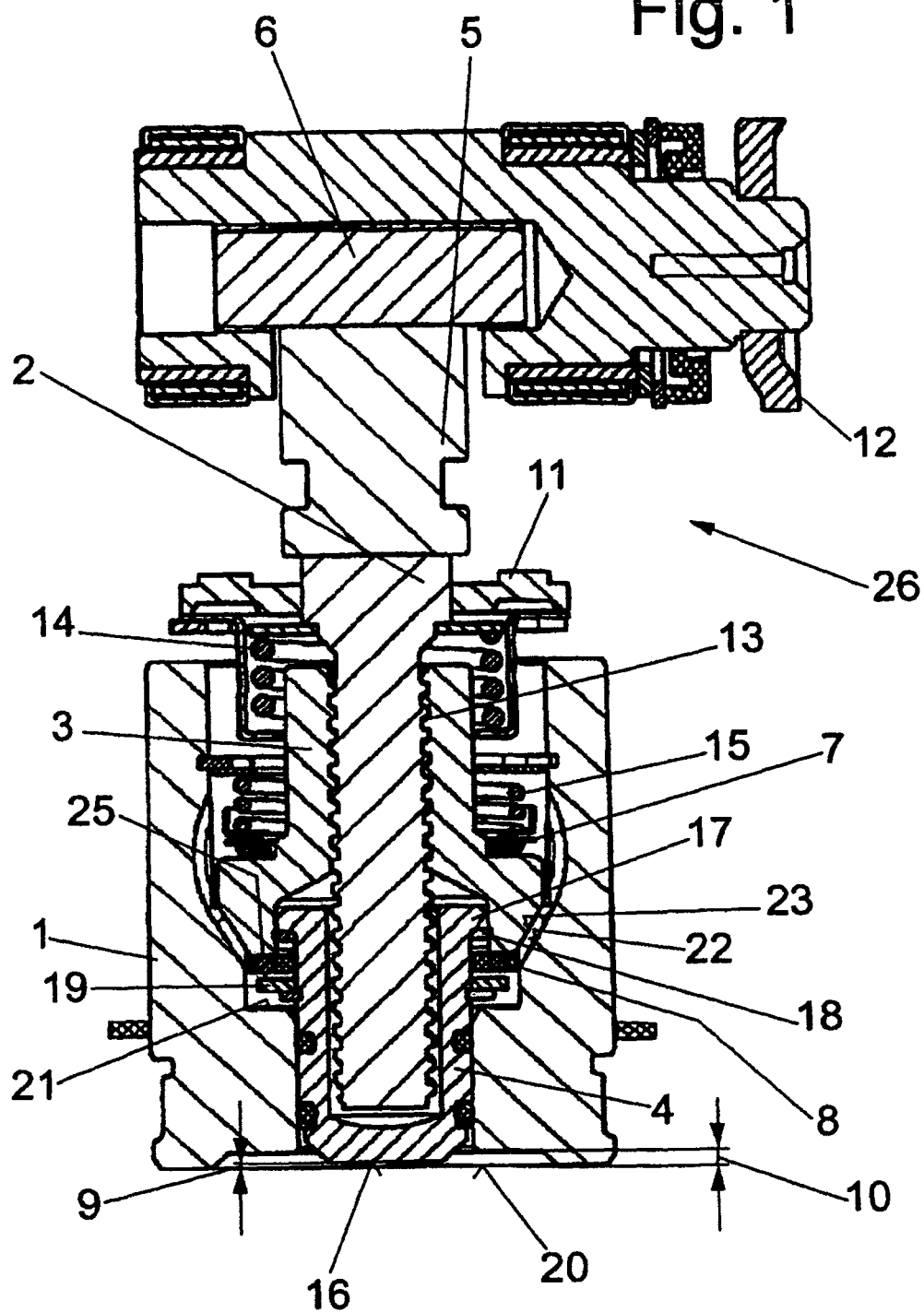
FIG. 1 shows a portion of an exemplary embodiment of a hydraulically actuated disc brake according to the invention having a parking brake device and adjusting device, in a partial sectional view.

FIG. 1 shows an exemplary embodiment of a hydraulic disc brake according to the invention, having a parking brake device 26 and having an adjusting device, in a partial sectional view. A further partial sectional view thereof is shown in FIG. 2.

Figure 2:
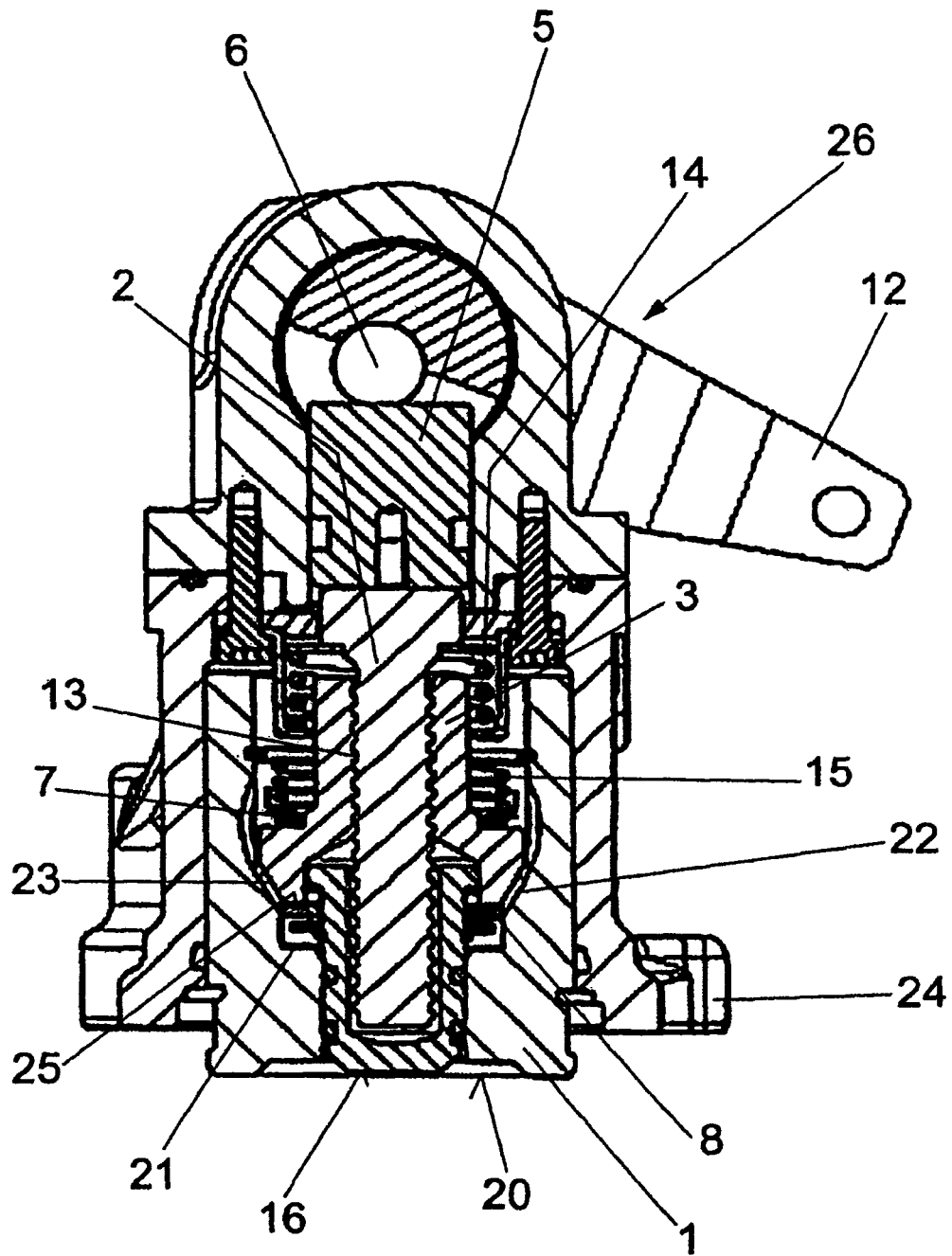
FIG. 2 shows a further partial sectional view of the hydraulically actuated disc brake according to the invention as per FIG. 1.

Reference is made to FIGS. 1 and 2. In this example, the hydraulically actuated disc brake has a brake piston 1, which is arranged in a movable fashion in a receptacle of a brake housing or brake caliper 24 (see FIG. 2). The brake housing 24 is a constituent part of a brake caliper (not otherwise illustrated in any more detail), which may be embodied in particular as a fixed caliper or sliding caliper and which, preferably, engages around the upper edge of a brake disc in the manner of a frame.

The brake piston 1 has a piston head 20, which is arranged at the bottom in FIGS. 1 and 2 and which is connected to a brake pad carrier (not shown) with an associated brake lining material which is designed and arranged so as to make contact with a brake disc (likewise not shown). The application direction of the brake piston 1 under the action of hydraulic pressure runs in the downward direction in FIGS. 1 and 2 toward the brake disc (not illustrated). The usual ports for the hydraulics for pressurizing the brake piston 1 are not illustrated.

The parking brake device 26 is operatively connected to the brake piston 1. For this purpose, the parking brake device 26 has the following: an actuating lever 12, which is rotationally fixedly connected to an actuating eccentric 6, for releasing a parking braking action; a pressure piston 5, which interacts with the actuating eccentric 6; a rotationally fixed adjusting screw 2 on which the pressure piston 5 acts; and an adjusting nut 3 which is arranged on a non-self-locking thread 13 of the adjusting screw 2. The adjusting screw 2 extends in the axial longitudinal direction of the brake piston 1 into a recess of the brake piston 1.

The adjusting nut 3 has, at its lower end, a friction cone 23, which interacts with a corresponding friction cone 22 in the brake piston 1 and forms a friction coupling 22, 23. The friction cone 23 of the adjusting nut 3 has, on its underside, an end surface 25 on which a second axial anti-friction bearing 8 is arranged.

The adjusting nut 3 also interacts with a first axial anti-friction bearing 7, a restoring spring 15, a compression spring 14 and an anti-twist facility 11, the functions of which will not be described in any more detail here in connection with an adjustment of the brake piston 1 as a function of the brake pad wear.

The lower end section of the adjusting nut 3 having the friction cone 22 is provided with a recess in which an upper section of a restoring piston 4 is arranged so as to be axially movable with a certain amount of play. In this example, the restoring piston 4 has, on its upper end, a shoulder 17, which interacts with a contact shoulder 18 of the adjusting nut 3. Here, the contact shoulder 18 of the adjusting nut 3 is formed as a bore locking ring. In the further axial profile of the restoring piston 4, below the second anti-friction bearing 8, a pressure disc 19 in the form of a raceway is fastened to the restoring piston 4, which pressure disc 19 is designed to interact with the second anti-friction bearing 8. The pressure disc 19 is, in this example, fixed in the downward axial direction by way of a shaft locking ring on the restoring piston 4.

The restoring piston 4 also extends with a lower section through a passageway of the piston head 20 and with its end side 16 into a depression 10, which is formed in the piston head 20. The lower section of the restoring piston 4 is sealed off in a suitable way with respect to the passageway in the piston head 20, for example by use of sealing rings, and is guided in an axially movable manner in the passage. The restoring piston 4 is arranged such that its end side 16 in the depression 10 of the piston head 20 has a projecting length 9 with respect to the base side of the depression 10, wherein the projecting length 9 is always less than or equal to the dimension of the depression 10.

During hydraulic actuation of the brake, the brake piston 1 moves in its longitudinal direction, downward in FIGS. 1, 2, toward the brake disc. Here, in this example, the restoring piston 4 bears with its shoulder 17 against the contact shoulder 18 of the adjusting nut 3 under the action of the hydraulic pressure, and thereby maintains the frictional contact, together with the force of the restoring spring 15, in the cone coupling 22, 23 in order to prevent a rotation of the adjusting nut 3. In the release direction of the cone coupling 22, 23, that is to say in the direction (upward in FIGS. 1 and 2) opposite to the movement direction of the brake piston 1 during a hydraulic actuation, the restoring piston 4 has, in said state of hydraulic actuation, a small spacing with respect to the adjusting nut 3 with the interposed second axial anti-friction bearing 8, which spacing ensures a minimum play even taking into consideration tolerances and operational deformations. On the side facing toward the brake pad, the restoring piston 4 has the defined projecting length 9 with respect to the contact surface in the depression 10 of the piston head 20.

The function of the restoring of the brake piston 1 in the event of a brake pad exchange is explained below.

After the brake pad carrier, which belongs to the brake piston 1, with the worn brake pad is removed, to restore the brake piston 1 (in the upward direction in FIGS. 1 and 2), a spacer is now inserted into the depression 10 of the piston head 20, which spacer is supported, on its side facing away from the brake piston 1, on the brake disc. Here, the other side of the spacer is supported on the end side 16 of the restoring piston 4. In the case of multi-piston brakes, spacers of this type are inserted in each case into the depressions 10 of all the brake pistons 1. The sliding caliper is then pushed in the direction of the brake disc (downward in FIGS. 1 and 2). The spacer, with its side bearing against the end side 16 of the restoring piston 4, pushes the latter back until the spacer bears against the contact surface on the base of the depression 10 and the end side 16 of the restoring piston 4 is aligned or flush with the contact surface on the base of the depression 10. In this example, during the rearward movement, the restoring piston 4 sets down via the pressure disc 19 via the second axial anti-friction bearing 8 on the end surface 25 and lifts the end surface 25 with its friction cone 23 off of its seat on the friction cone 22 of the brake piston 1. In this way, the adjusting nut 3 passes out of its frictionally locked state and may now be turned back, as the brake piston 1 is pushed back further, in the non-self-locking thread 13 of the adjusting screw 2 under the action of an axial force which is generated by the pushing of the brake caliper in the direction of the brake disc.

In a further embodiment, during a hydraulic actuation of the brake, the restoring piston 4 can bear against a contact shoulder 21 of the brake piston 1 under the action of the pressure. In one particular design (in which the pressure disc 19 is fixed axially in both directions to the restoring piston 4), the contact may, for example, take place via the underside of the pressure disc 19 and/or via the shaft locking ring. In this state, to the end surface 25 of the adjusting nut 3 with the interposed second axial anti-friction bearing 8, a small spacing ensures a minimum play even taking into consideration tolerances and operational deformations. Here, it is important that, in all operating states of the brake, the restoring piston 4 does not impair the frictional locking action of the cone coupling 22, 23, but rather eliminates the frictional locking action only when the spacer is inserted into the depression 10 during the restoring process.

The restoring of the brake piston 1 is therefore achieved, after the insertion of the spacer, by simply pushing the brake caliper or sliding the caliper. The spacer is then removed from the depression 10 again.

FIG. 2 shows a partial sectional view as per FIG. 1, rotated through 90° about the longitudinal axis of the brake piston 1. Here, it is possible to see the brake housing 24 with associated fastening elements for the parking brake unit 26. The parking brake function is activated by actuating the actuating lever 12 in a counterclockwise pivoting direction. Here, the actuating eccentric 6 acts on the pressure piston 5, in such a way that a transmission of force takes place in the axial direction of the brake piston 1 to the adjusting screw 2 and via the thread 13 to the adjusting nut 3 and via the cone coupling 22, 23 to the brake piston 1. This parking brake function is not impaired by the restoring piston 4. The adjusting function of the adjusting device is likewise not influenced by the restoring piston 4. The axial bearings 7 and/or 8 may also be designed as plain bearings, as is schematically indicated for example in FIG. 2.

TABLE OF REFERENCE NUMERALS

1 Brake piston
2 Adjusting screw
3 Adjusting nut
4 Restoring piston
5 Pressure piston
6 Actuating eccentric
7 First axial anti-friction bearing
8 Second axial anti-friction bearing
9 Projecting length of the restoring piston
10 Depression in the piston head
11 Anti-twist facility
12 Actuating lever
13 Thread
14 Compression spring
15 Restoring spring
16 End side, restoring piston
17 Shoulder, restoring piston
18 Contact shoulder, adjusting nut
19 Pressure disc
20 Piston head
21 Contact shoulder, brake piston
22 Cone coupling friction cone, brake piston
23 Cone coupling friction cone, adjusting nut
24 Brake housing
25 End surface, adjusting nut
26 Parking brake device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hydraulically actuated disc brake, comprising:
   a brake housing;
   a brake piston arranged in the brake housing, the brake piston acting upon a brake pad in use;
   a parking brake device operatively coupled with the brake piston; and
   a restoring piston operatively arranged in a head of the brake piston, said head of the brake piston facing toward the brake pad in use,
   wherein
   the brake piston includes a depression formed in a brake piston head facing toward the brake pad in use,
   the parking brake device comprises
      an actuating lever rotationally fixedly connected to an actuating eccentric for releasing a parking braking action,
      a pressure piston, which interacts with the actuating eccentric,
      a rotationally fixed adjusting screw on which the pressure piston acts, and
      an adjusting nut, which is arranged on a non-self-locking thread of the adjusting screw,
   the adjusting nut has at one end a friction cone which interacts with a corresponding friction cone in the brake piston and forms a friction coupling,
   the friction cone of the adjusting nut has, on an underside facing toward the brake pad in use, an end surface on which an axial anti-friction bearing is arranged around the restoring piston at a location closer to a brake pad-end of the adjusting nut than an adjusting nut-contact surface of the restoring piston, and
   the restoring piston includes a receptacle to receive the adjusting screw.

2. The hydraulically actuated disc brake according to claim 1, wherein, during hydraulic actuation of the disc brake, the restoring piston bears against a contact shoulder of the adjusting nut under action of pressure.

3. The hydraulically actuated disc brake according to claim 1, wherein the restoring piston, when bearing against the contact shoulder of the adjusting nut under the action of pressure, maintains frictional contact, together with a force of a restoring spring, in a cone coupling in order to prevent rotation of the adjusting nut, and, in a release direction of the cone coupling, has a small spacing with respect to the adjusting nut with an interposed axial bearing, such that a minimum play is ensured, and with the restoring piston having, on a side facing toward the brake pad, a defined projecting length with respect to the contact surface in the depression of the piston head.

4. The hydraulically actuated disc brake according to claim 1, wherein during hydraulic actuation of the brake, the restoring piston bears against a contact shoulder of the brake piston under action of pressure, with the restoring piston, in said state, having a small spacing with respect to an adjusting nut with an interposed axial bearing, such that a minimum play is ensured, and with the restoring piston having, on a side facing toward the brake pad, a defined projecting length with respect to the contact surface in the depression of the piston head.

5. The hydraulically actuated disc brake according to claim 1, wherein the adjusting screw extends in an axial longitudinal direction of the brake piston into a recess of the brake piston.

6. The hydraulically actuated disc brake according to claim 1, wherein the end section of the adjusting nut having the friction cone is provided with a recess, in which an upper section of the restoring piston is arranged so as to be axially movable with a certain play.

7. The hydraulically actuated disc brake according to claim 1, wherein the restoring piston has, on an end, a shoulder which interacts with a contact shoulder of the adjusting nut.

8. The hydraulically actuated disc brake according to claim 1, wherein the restoring piston extends with a section facing toward the brake pad in use through a passageway of the piston head and with an end side into the depression in the piston head.

9. The hydraulically actuated disc brake according to claim 8, wherein the section facing toward the brake pad in use of the restoring piston is sealed off with respect to the passageway in the piston head.

10. The hydraulically actuated disc brake according to claim 8, wherein the restoring piston is guided in an axially movable manner in the passageway.

11. The hydraulically actuated disc brake according to claim 9, wherein the restoring piston is guided in an axially movable manner in the passageway.

\* \* \* \* \*